(12) United States Patent
Soryal

(10) Patent No.: US 12,170,904 B2
(45) Date of Patent: Dec. 17, 2024

(54) AUTOMATED SECURITY HANGAR FOR PRIVATE CELLULAR NETWORKS

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 158 days.

(21) Appl. No.: 17/453,266

(22) Filed: Nov. 2, 2021

(65) Prior Publication Data

US 2023/0134941 A1    May 4, 2023

(51) Int. Cl.
*H04W 12/63* (2021.01)
*H04W 12/03* (2021.01)
*H04W 12/122* (2021.01)

(52) U.S. Cl.
CPC .......... *H04W 12/63* (2021.01); *H04W 12/03* (2021.01); *H04W 12/122* (2021.01)

(58) Field of Classification Search
CPC ... H04W 12/63; H04W 12/03; H04W 12/122; H04W 4/021; H04W 12/08
USPC .......................................................... 726/2
See application file for complete search history.

(56) References Cited

U.S. PATENT DOCUMENTS

| | | | | |
|---|---|---|---|---|
| 8,483,659 B2 * | 7/2013 | Mahajan | ............ | G08B 13/1418 455/410 |
| 8,572,119 B2 * | 10/2013 | Savage | ................ | H04L 9/3271 713/193 |
| 8,621,034 B1 * | 12/2013 | Kembel | ................ | G06F 3/0481 709/217 |
| 9,659,021 B1 * | 5/2017 | Dobrean | ................... | G06F 16/13 |
| 9,887,995 B2 * | 2/2018 | Rotter | .................... | H04W 12/06 |
| 10,055,591 B1 * | 8/2018 | Sharifi Mehr | .......... | G06F 21/36 |
| 10,922,777 B2 * | 2/2021 | Kuersten | ................ | G06Q 50/28 |
| 11,134,104 B2 * | 9/2021 | Qureshi | ............. | H04L 63/0471 |
| 11,226,393 B2 * | 1/2022 | Carter | ...................... | H01Q 5/25 |
| 2015/0051948 A1 * | 2/2015 | Aizono | ................... | G06Q 10/00 705/7.29 |
| 2015/0339937 A1 * | 11/2015 | Martin | ..................... | G09B 7/00 434/350 |
| 2016/0112871 A1 * | 4/2016 | White | ................... | H04W 12/06 726/4 |
| 2016/0292464 A1 * | 10/2016 | Alarabi | ............... | H04L 63/0876 |
| 2018/0004983 A1 * | 1/2018 | Gonzalez | ............. | G06K 7/1417 |
| 2018/0310125 A1 * | 10/2018 | Pérez Lafuente | ..... | H04W 24/00 |

(Continued)

*Primary Examiner* — Venkat Perungavoor
*Assistant Examiner* — Peiliang Pan

(57) ABSTRACT

The described technology is generally directed towards an automated security hangar for private cellular networks. In response to detecting that a user equipment is departing a geographic area served by a private cellular network, the user equipment can encrypt its data and send it to a private cellular network server. The server can receive and securely store the encrypted data, and the server can provide a code to the user equipment. The user equipment can store the code, disconnect from the private cellular network, and depart the geographic area. When the user equipment returns to the geographic area and reconnects to the private cellular network, the user equipment can present the code to the server. The server can validate the code, the user equipment, and/or the operator of the user equipment, and the server can return the encrypted data to the user equipment.

20 Claims, 10 Drawing Sheets

(56) References Cited

U.S. PATENT DOCUMENTS

| | | | |
|---|---|---|---|
| 2019/0340381 A1* | 11/2019 | Yavuz | G06F 21/606 |
| 2021/0086391 A1* | 3/2021 | Strasky | B27B 1/007 |
| 2021/0186310 A1* | 6/2021 | Alexander | A61B 1/00016 |
| 2021/0352144 A1* | 11/2021 | Puleston | H04L 67/1097 |
| 2022/0198101 A1* | 6/2022 | Linehan | G05B 13/04 |

* cited by examiner

AUTOMATED SECURITY HANGAR FOR PRIVATE CELLULAR NETWORKS

TECHNICAL FIELD

The subject application is related to cellular communication networks, and more particularly, to security of user equipment that connects to private cellular communication networks.

BACKGROUND

A private cellular network (PCN) uses cellular network technologies to create a dedicated network within a geographic area. A PCN can use cellular technologies, such as the long-term evolution (LTE) or fifth generation (5G) technologies that are used by the public mobile operators, to provide a wireless network at, e.g., premises of a business, college, or government complex. In some cases, a PCN can operate similarly to a wireless LAN (e.g., Wi-Fi) but can use mobile technology and spectrum to support more advanced uses than those supported by wireless LAN technologies.

Conventional choices for deploying wireless broadband connectivity, such as Wi-Fi and public cellular networks, may not deliver the efficiency, control and security that some enterprises need for their business operations. Example benefits of PCNs include improved control and management of connectivity, increased availability and coverage, control over operating processes, controlled latency, and network slicing.

One particular benefit offered by PCNs is enhanced data security, because data can be segregated and processed locally, separately from public networks. However, data that is stored at user equipment, such as at an employee's mobile device, remains vulnerable when the employee leaves the premises. There are not presently any adequate ways to address this vulnerability to further secure PCNs for enterprises that require strong data security.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
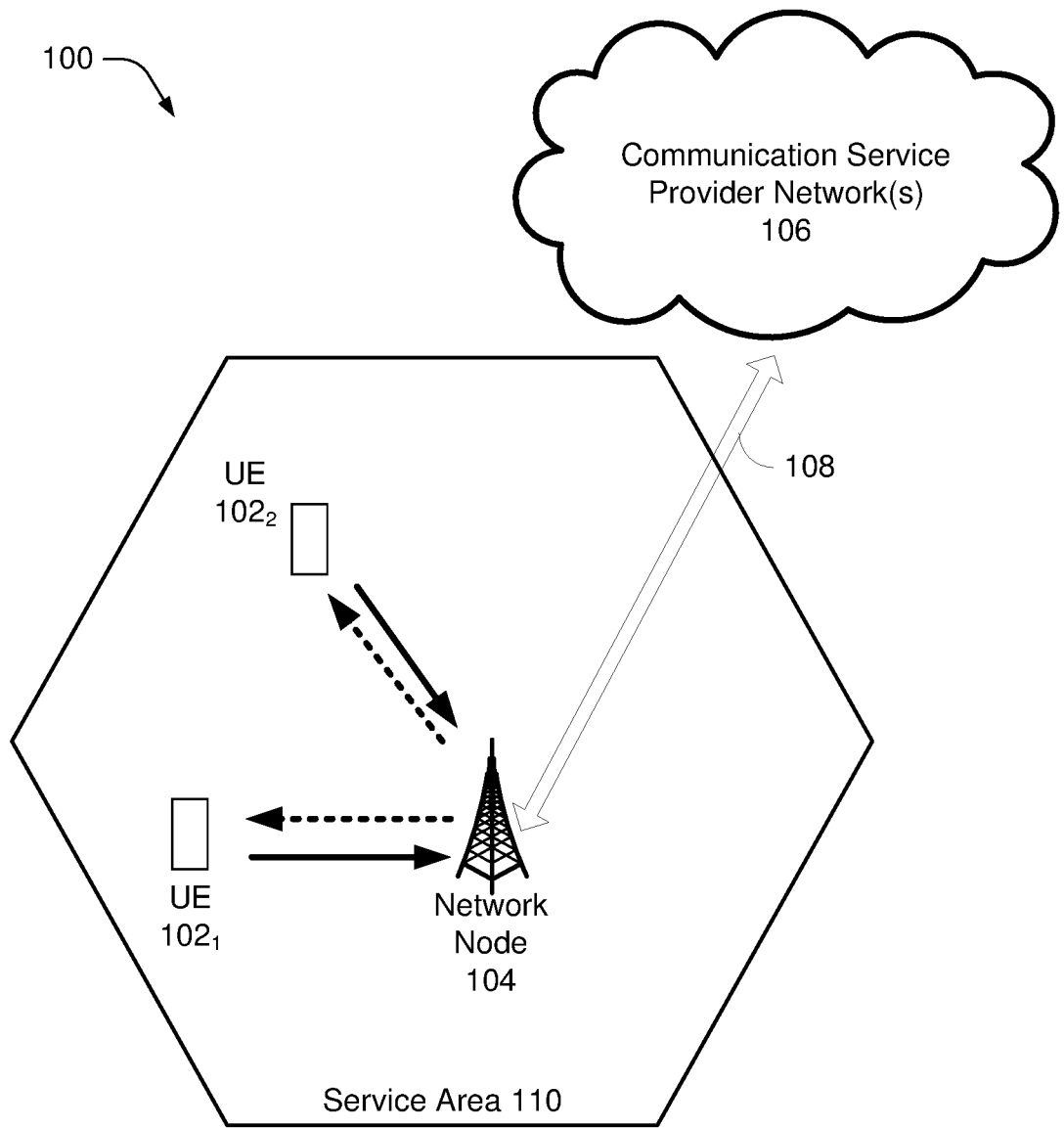
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards an automated security hangar for private cellular networks. In response to detecting that a user equipment is departing a geographic area served by a private cellular network, the user equipment can encrypt its data and send it to a private cellular network server. The server can receive and securely store the encrypted data, and the server can provide a code to the user equipment. The user equipment can store the code, disconnect from the private cellular network, and depart the geographic area. When the user equipment returns to the geographic area and reconnects to the private cellular network, the user equipment can present the code to the server. The server can validate the code, the user equipment, and/or the operator of the user equipment, and the server can return the encrypted data to the user equipment. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMOs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
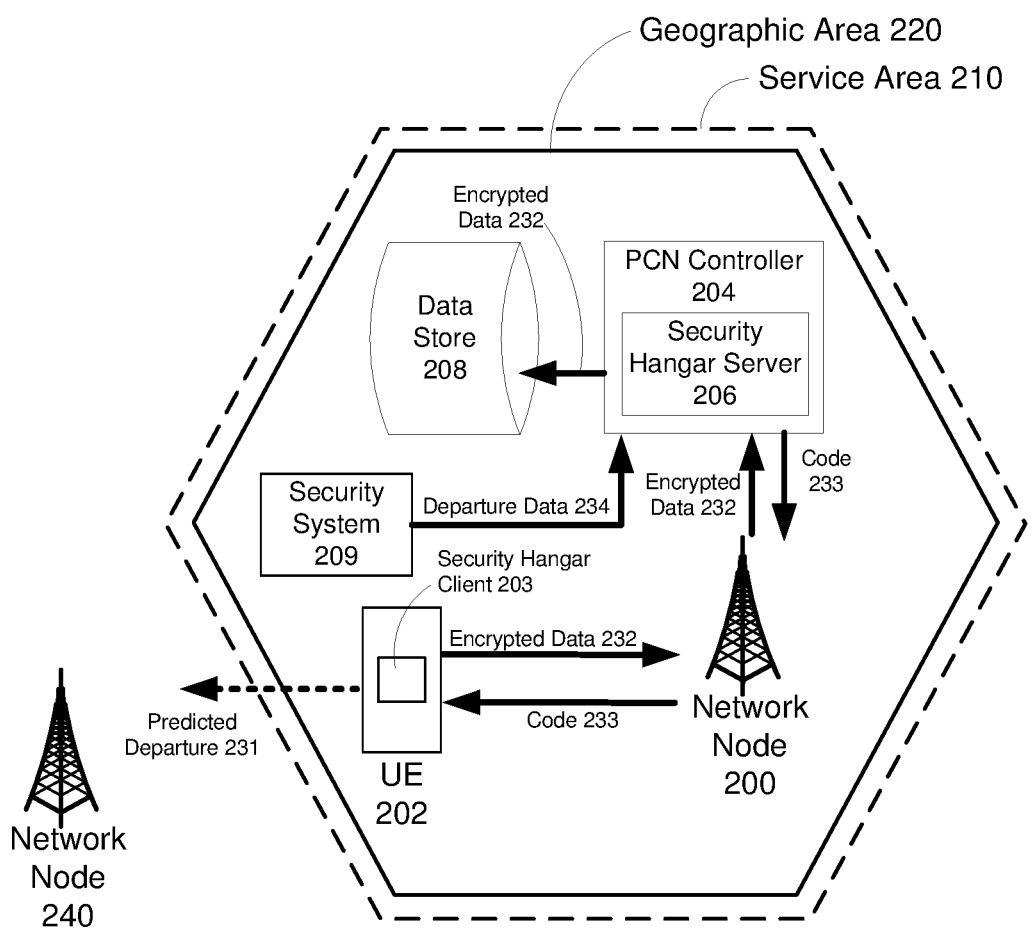
FIG. 2 illustrates an example private cellular network (PCN) equipped with an automated security hangar, and operations performed in connection with departure of a device from the PCN, in accordance with various aspects and embodiments of the subject disclosure.

FIG. 2 illustrates an example private cellular network (PCN) equipped with an automated security hangar, and operations performed in connection with departure of a device from the PCN, in accordance with various aspects and embodiments of the subject disclosure. FIG. 2 illustrates a network node 200 and a PCN controller 204 that can provide a PCN having a service area 210 that serves a geographic area 220. FIG. 2 furthermore illustrates a UE 202 that can connect to the illustrated PCN via network node 200, when the UE 202 is within the service area 210. The UE 202 can also connect to other network nodes which are not part of the PCN, such as network node 240, when the UE 202 departs from the geographic area 220 and/or the service area 210. The UE 202 comprises a security hangar client 203, and the PCN controller 204 comprises a security hangar server 206, which can cooperate to secure data from the UE 202 when the UE 202 departs from the PCN, as described herein. FIG. 2 furthermore illustrates a security system 209 and a data store 208, which can also be used in connection with operations described herein.

The network nodes 200, 240 can implement a network node 104 such as described in connection with FIG. 1, wherein the network node 200 is configured to operate in connection with a PCN. Likewise, the service area 210 can implement a service area 110, and the UE 202 can implement a UE 102 as described in connection with FIG. 1. The PCN controller 204 can implement aspects of communication service provider network(s) 106 as described in connection with FIG. 1, wherein the PCN controller 204 is configured to operate in connection with a PCN.

In an example according to FIG. 2, the UE 202 and/or the PCN controller 204 can identify a predicted departure 231 of the UE 202 from the geographic area 220. The predicted departure 231 can be identified, for example, based on movement of the UE 202 toward a boundary of the geographic area 220, or based on signal strength measurements reported by UE 202, or based on historical departure times of UE 202 from the geographic area 220, or based on departure data 234 received from security system 209. Departure data 234 can include, e.g., information from a secure gate that indicates an owner of the UE 202 has exited the secure gate. Such information may be based on face recognition, license plate recognition, radio frequency identification (RFID) information, or other information depending on the type of security employed at security system 209.

In response to the predicted departure 231, the security hangar client 203 can cause the UE 202 to encrypt data. The UE 202 can dynamically generate an encryption key to be used for the encryption process. The encrypted data can include, e.g., substantially all data that is used by UE 202 in connection with a first persona that is implemented at the UE 202 for use in connection with the PCN. For example, the encrypted data can include parameters such as PCN network settings and other PCN network information, communications of the UE 202 via the PCN, such as emails, text messages, voicemails, and call history, stored user profile information such as usernames and passwords to access network resources, and any other data at the UE 202.

The security hangar client 203 can cause the UE 202 to send the resulting encrypted data 232 to the security hangar server 206 via the network node 200, and the security hangar client 203 can subsequently delete the encrypted data 232 as well as other forms of the encrypted data 232, e.g., the unencrypted data used to generate the encrypted data 232, from the UE 202. The security hangar server 206 can receive the encrypted data 232 and store the encrypted data 232 in the data store 208. In an embodiment, the UE 202 need not provide the encryption key to the PCN, and therefore the PCN cannot decrypt the encrypted data 232 and the privacy of the encrypted data 232 remains protected. The security hangar server 206 can dynamically generate a code 233 and can send the code 233 to the UE 202 via the network node 200. The code 233 can comprise, e.g., an alphanumeric string or other code of any desired length. Codes comprising eight or more characters including, e.g., numbers, capital letters, lowercase letters, and symbols can provide stronger security, as will be appreciated.

The security hangar client 203 can store the code 233 and the encryption key used to encrypt the encrypted data 232 locally at the UE 202, and the UE 202 can proceed to depart from the geographic area 220. The UE 202 can be equipped with a second persona for use in connection with networks other than the PCN. Thus, when the UE 202 connects to the network node 240 after departing the geographic area 220, the UE 202 can do so using the second persona and any stored second persona data. The first persona, which is used in connection with the PCN, can remain in place at the UE 202 however the first persona can comprise little or no data other than the code 233 and the encryption key. In some embodiments, the security hangar client 203 can be configured as an anti-cloning component, so that neither security hangar client 203, the code 233, nor the encryption key are cloned in the event that the UE 202 is cloned.

Figure 3:
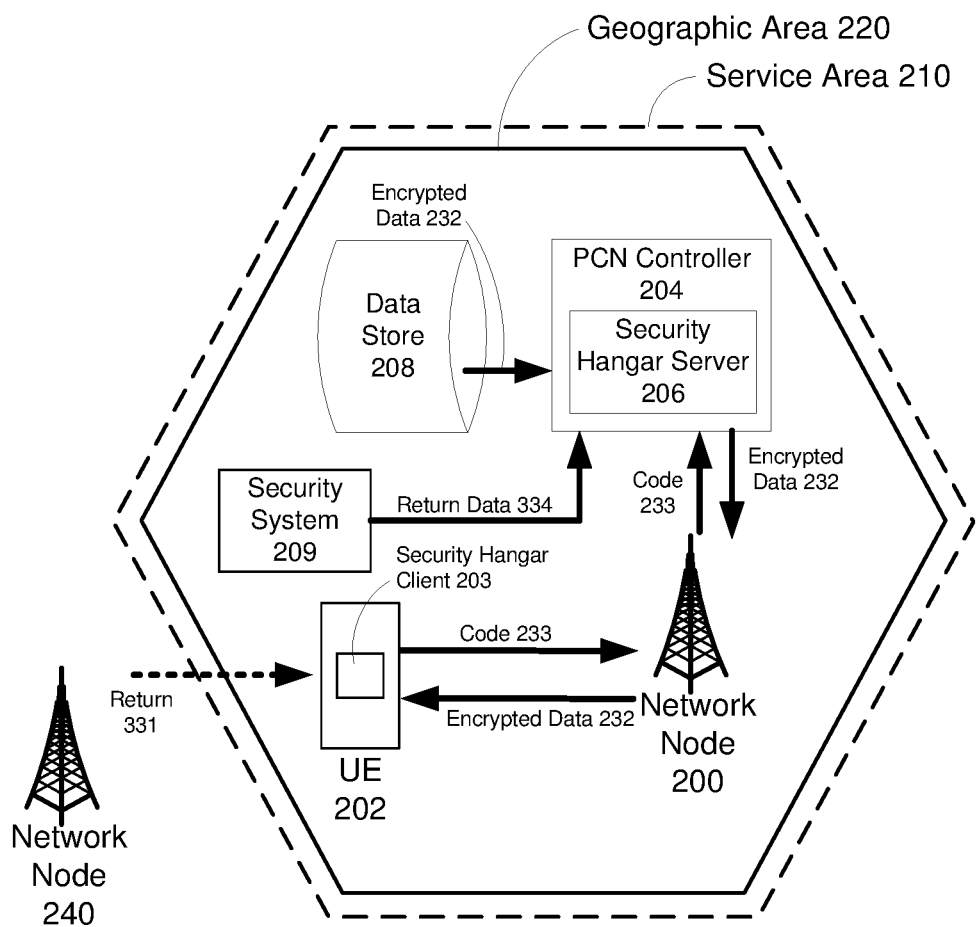
FIG. 3 illustrates the PCN introduced in FIG. 2, and operations performed in connection with return of a device to the PCN, in accordance with various aspects and embodiments of the subject disclosure.

FIG. 3 illustrates the PCN introduced in FIG. 2, and operations performed in connection with return of a device to the PCN, in accordance with various aspects and embodiments of the subject disclosure. FIG. 3 includes the network node 200, service area 210, geographic area 220, UE 202 equipped with security hangar client 203, PCN controller 204 equipped with security hangar server 206, data store 208, security system 209 and network node 240 introduced in FIG. 2.

In an example according to FIG. 3, the UE 202 and/or PCN controller 204 can identify a return 331 of the UE 202 to the PCN implemented by network node 200 and PCN controller 204. The return 331 can be identified, e.g., by UE 202 connecting to network node 200, or for example by location information indicating UE 202 is located within the geographic area 220, or by return data 334 from security system 209 which indicates, e.g., that the owner of the UE 202 has entered the geographic area 220. The return data 334 can comprise, e.g., data such as described with reference to departure data 234.

In response to the return 331, the UE 202 can switch from the second persona used in connection with other networks such as implemented by network node 240, to the first persona used in connection with the PCN. The security hangar client 203 can attempt to recover the encrypted data 232 for the first persona by sending the code 233 to the security hangar server 206.

The security hangar server 206 can be configured to receive the code 233 from the security hangar client 203 and use the code 233 and/or an identifier for the UE 202 to lookup the encrypted data 232 in the data store 208. The security hangar server 206 can retrieve the encrypted data 232 from the data store 208 and send the encrypted data 232 to the UE 202 via the network node 200.

The security hangar server 206 can optionally be configured to validate the return 331 of the UE 202 and/or the owner of the UE 202 prior to sending the encrypted data 232 to the UE 202. For example, the security hangar server 206 can verify that an identifier of the UE 202 matches a stored identifier of the UE 202 that was extracted and stored prior to departure 231 of the UE 202 from the geographic area 220. The security hangar server 206 can check return data 334 to verify that an owner associated with the UE 202 has entered the geographic area 220. The security hangar server 206 can validate the code 233 by comparing it to the code provided to the UE 202 prior to departure 231 of the UE 202 from the geographic area 220. The security hangar server 206 can provide the encrypted data 232 to the UE 202 when the return 331 of the UE 202 and/or the owner of the UE 202 can be validated. Otherwise, the security hangar server 206 can initiate further security processes, e.g., a physical check of the UE 202 and the owner of the UE 202, prior to providing the encrypted data 232.

The UE 202 can receive the encrypted data 232 and use the stored encryption key to decrypt the encrypted data 232. The UE 202 can then store the resulting decrypted data in appropriate destination locations to populate the first persona. For example, network settings can be stored in appropriate locations to be used by the UE 202, and communications such as emails and text messages can be stored as application data to be used by applicable applications at the UE 202.

With regard to FIG. 2 and FIG. 3 in general, hybrid models can use a subscriber identity module (SIM) on a UE 202 with dual personas, e.g., a first persona for a PCN and a second persona for public networks. When a UE 202 is within a PCN service area 210, the SIM can route traffic internally within the PCN. When the UE 202 leaves the service area 210, the SIM can route the traffic as any 5G handset with regular flows into a core network.

While such a hybrid model secures traffic locally within the PCN, when the UE 202 leaves the service area 210, the UE 202 and its SIM are vulnerable to be cloned or to credential leaks that leak data for later use by attackers.

Using the approach described with reference to FIG. 2 and FIG. 3, a UE 202 can leave parameters (e.g., parameters that would not be used in the public domain) at the private domain of the PCN before leaving the geographic area 220 into the public domain. Then the UE 202 can get its parameters back when it returns to the private domain within geographic area 220.

Example parameters that can be encrypted in order to produce encrypted data 232 include, e.g., network device configurations and preferences, activities (such as calls, texts, chats, emails, files exchanged, etc.), and media exchanged (such as pictures taken, sent, received, voicemails, etc.). After encrypting and sending these parameters to the security hangar server 206, the first persona can become a "ghost" persona with little or no data/parameters stored at the UE 202.

In order to set up a UE 202 to use the techniques described herein, the UE 202 can be configured and provisioned into both the PCN and a public network. The security hangar client (SHC) 203 can be installed on the UE 202 and the SHC 203 can be configured to communicate with the security hangar server (SHS) 206.

The SHC 203 can be configured to distinguish which network (PCN or public) is active. When the PCN is active, the SHC 203 can record parameters used by the UE 202. The SHC 203 can also optionally record parameters used by the UE 202 when the public network is active.

The SHC 203 or SHS 206 can monitor signal strength, e.g., of signals received at UE 202 from network node 200, or vice versa. When signal strength becomes weaker, or for example when UE 202 begins attempting to catch a public network registration signal from network node 240, the SHC 203 or SHS 206 can infer that a predicted departure 231 is imminent. In response, the SHC 203 can encrypt the parameters pertaining to the private domain and ship them to the SHS 206 and the associated data store 208.

In some embodiments, the UE 202 can also be configured to "check in" and "check out" data and parameters associated with its second persona, i.e., its public persona. For example, the UE 202 can be configured to "check out" its public persona parameters from the SHS 206 upon predicted departure 231. The SHC 203 can invoke its public persona from the SHS 206 and the data store 208. The UE 202 can be configured to "check in" its public persona parameters upon return 331, by encrypting and sending parameters to SHS 206 in return for a code such as 233. The procedures for checking in/checking out second persona data can be similar to those described herein with regard to first persona data, with the difference that the second persona procedures can be performed in reverse order, by acquiring data when leaving geographic area 220 and encrypting/deleting/sending data to SHS 206 when entering geographic area 220.

The SHC 203 and SHS 206 can communicate and coordinate. The SHS 206 can be connected with the data store 208 and is also connected with network node 200, and SHS 206 therefore has access to UE 202 signal power levels which can be used to identify the predicted departure 231 as well as to identify the return 331.

In some embodiments, when the UE 202 moves in or out of the geographic area 220, and before the SHC 203 encrypts UE 202 parameters, the SHC 203 can selectively query the UE 202 and examine its logs and events (e.g., for incoming messages, new photos, etc.) to verify that the UE 202 is the same UE that was originally provisioned and/or the same UE that previous previously departed from the geographic area 210, and not an impersonator. The SHC 203 can also ensure that UE 202 data indicating the duration the UE 202 was away from the PCN matches PCN records.

Figure 4:
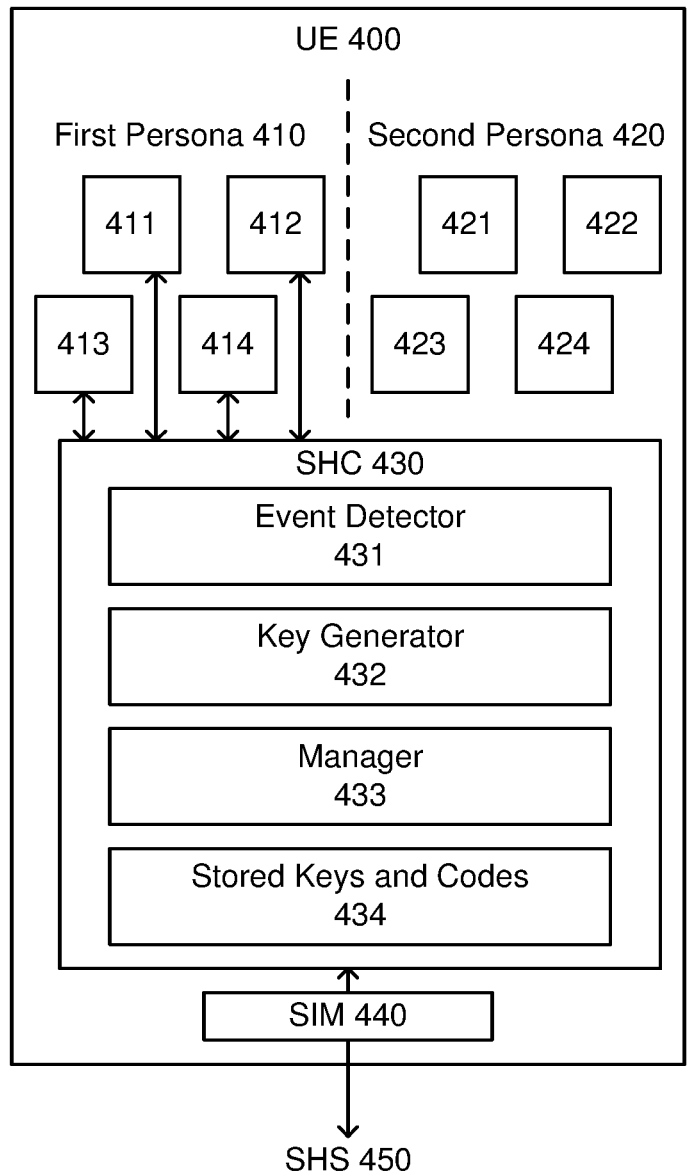
FIG. 4 illustrates an example user equipment (UE) comprising a security hangar client, in accordance with various aspects and embodiments of the subject disclosure.

FIG. 4 illustrates an example user equipment (UE) comprising a security hangar client, in accordance with various aspects and embodiments of the subject disclosure. The example UE 400 can implement, e.g., the UE 202 illustrated in FIG. 2 and FIG. 3. UE 400 comprises a first persona 410 and a second persona 420. The first persona 410 can be designated for use with a PCN, while the second persona 420 can be designated for use with public networks, as described herein. The first persona 410 comprises various example data 411, 412, 413, and 414, and the second persona 420 comprises various example data 421, 422, 423, and 424.

The UE 400 furthermore comprises an SHC 430 which can implement, e.g., the security hangar client 203 introduced in FIG. 2. The SHC 430 comprises an event detector 431, a key generator 432, a manager 433, and stored keys and codes 434. The SHC 430 can communicate with an SHS 450 via a SIM 440. The SHS 450 can implement, e.g., the security hangar server 206 introduced in FIG. 2.

In an example according to FIG. 4, the event detector 431 can be configured to identify the predicted departure 231 and/or the return 331, illustrated in FIG. 2 and FIG. 3, respectively. In response to a detected departure or return event, the manager 433 can orchestrate the departure or return operations described herein.

Example departure operations can include, e.g., activating key generator 432 to dynamically generate an encryption key, and storing the resulting encryption key in stored keys and codes 434. The manager 433 can then collect data 411, 412, 413, and 414, while also generating a list of storage/directory locations for data 411, 412, 413, and 414. The manager 433 can encrypt the collected data 411, 412, 413, and 414 as well as the list of storage/directory locations, and the manager 433 can send the resulting encrypted data, as encrypted data 232, to SHS 450. The manager 433 can receive a code 233 from SHS 450 and store the code 233 in stored keys and codes 434. The manager 433 can delete the data 411, 412, 413, and 414 from the UE 400. Finally, the manager 433 can activate the second persona 420 for use in connection with public networks.

In some embodiments, the manager 433 can use a distributed encryption technique to encrypt the collected data 411, 412, 413, and 414. For example, the manager 433 can gather the collected data 411, 412, 413, and 414 to be left at the SHS 450. The manager 433 can separate the collected data 411, 412, 413, and 414 into multiple parts, e.g., into halves. For example, a picture which is represented by bits can be separated into even number bits (second bit, fourth bit, sixth bit, etc.) and odd number bits (first bit, third bit, fifth bit, etc.). More complex mechanisms to divide the bits into two halves are also implementable. The manager 433 can encrypt one part, e.g., the even numbered bits, and can send the encrypted part (even numbered bits) along with the unencrypted part (odd numbered bits) to the SHS 450. The SHS 450 can be configured to use a different encryption key to encrypt the unencrypted part (odd numbered bits) and can then store the encrypted data. With such a distributed encryption technique, the SHS 450 would not be able to decrypt the collected data 411, 412, 413, and 414 on its own, and a hacker would need to compromise two entities to decrypt the collected data 411, 412, 413, and 414.

Example return operations can include, e.g., the manager 433 activating the first persona 410 and sending the code 233 stored in stored keys and codes 434 to the SHS 450. The manager 433 can then receive encrypted data 232 sent by SHS 450 in response to the code 233. The manager 433 can then use the encryption key stored in stored keys and codes 434 to decrypt the received encrypted data 232, as well as the list of storage/directory locations, resulting in decrypted data 411, 412, 413, and 414 and a decrypted list of storage/directory locations. The manager 433 can store the decrypted data 411, 412, 413, and 414 in the storage/directory locations indicated in the decrypted list of storage/directory locations.

In embodiments that use distributed encryption, the SHS 450 can decrypt half of the encrypted data 232 (e.g., the odd numbered bits) prior to delivering the encrypted data 232 to the UE 400. The manager 433 can decrypt the remaining encrypted half of the encrypted data 232 (e.g., the even numbered bits), and the manager 433 can reassemble the bits to restore the original data 411, 412, 413, and 414.

In general, the SHC 430 can be enabled to configure the UE 400 and populate data (e.g., media, text, account credentials, etc.) to be used by first persona 410. The SHC 430 can be configured to package existing parameters, such as data 411, 412, 413, and 414, encrypt the parameters, and send them to the SHS 450. The SHC 430 can furthermore be configured to erase UE 400 memory cards and neutralize UE 202 configurations to default. The SHC 430 can optionally also import data 421, 422, 423, and 424 from SHS 450 for the second persona 420 and populate the second persona 420 with its data 421, 422, 423, and 424, e.g., upon a departure 231. When the SHC 430 posts a package of encrypted data 232 to the SHS 450, it can encrypt the package with a unique dynamically generated encryption key that can change with every post.

Figure 5:
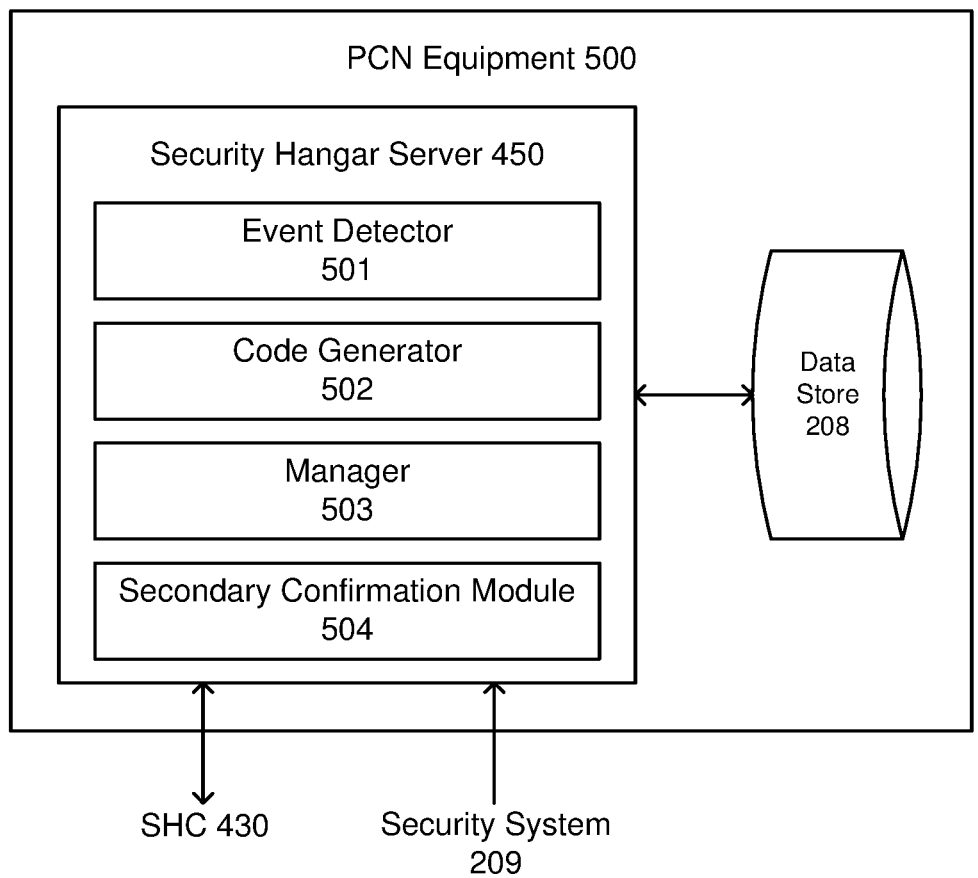
FIG. 5 illustrates example PCN equipment comprising a security hangar server, in accordance with various aspects and embodiments of the subject disclosure.

FIG. 5 illustrates example PCN equipment comprising a security hangar server, in accordance with various aspects and embodiments of the subject disclosure. The PCN equipment 500 can implement, e.g., the PCN controller 204 introduced in FIG. 2, or another server device coupled to the PCN controller 204. The SHS 450 can provide the SHS 450 introduced in FIG. 4, as well as the security hangar server 206 introduced in FIG. 2. The illustrated example SHS 450 comprises an event detector 501, a code generator 502, a manager 503, and a secondary confirmation module 504. The SHS 450 can communication with an SHC 430 (see FIG. 4), a security system 209 (see FIG. 2) and a data store 208 (see FIG. 2).

In an example according to FIG. 5, the event detector 501 can be configured to identify the predicted departure 231 and/or the return 331, illustrated in FIG. 2 and FIG. 3. In response to a detected departure or return event, the manager 503 can orchestrate the departure or return operations described herein.

Example departure operations can include, e.g., receiving encrypted data 232 from a UE 202, storing encrypted data 232 in the data store 208, and activating code generator 502 to generate a code 233. The manager 503 can store the code 233 locally at the PCN equipment 500 and can optionally associate the code 233 with the encrypted data 232 in the data store 208. The manager 503 can also send the code 233 to the UE 202.

Example return operations can include, e.g., receiving a code 233 from a UE 202, and using the code 233, a UE identifier, or other data to look up and retrieve encrypted data 232 from the data store 208. The manager 503 can optionally activate secondary confirmation module 504 to perform a secondary confirmation that the UE 202 or an owner of the UE 202 has entered the geographic area 220. Secondary confirmation module 504 can optionally retrieve and confirm information from security system 209, as described herein. With a positive confirmation from secondary confirmation module 504, the manager 503 can send the encrypted data 232 to the UE 202.

In some embodiments, when the UE 202 leaves the geographic area 220, the SHS 450 can embed a secret code 233 into the SHC 430, and this secret code 233 can facilitate the SHS 450 subsequently recognizing the UE 202 when the UE 202 returns again to the geographic area 220. The process can be secure in part by using an SHC 430 that is anti-cloning. Once the SHS 450 recognizes the UE 202 as it enters the geographic area 220, SHS 450 can invoke its own profile and ask the SHC 430 for the regular credentials. Once verified, the SHC 430 can receive a package comprising encrypted data 232, and SHC 430 can decrypt the package and use its parameters to populate the UE 202.

Figure 6:
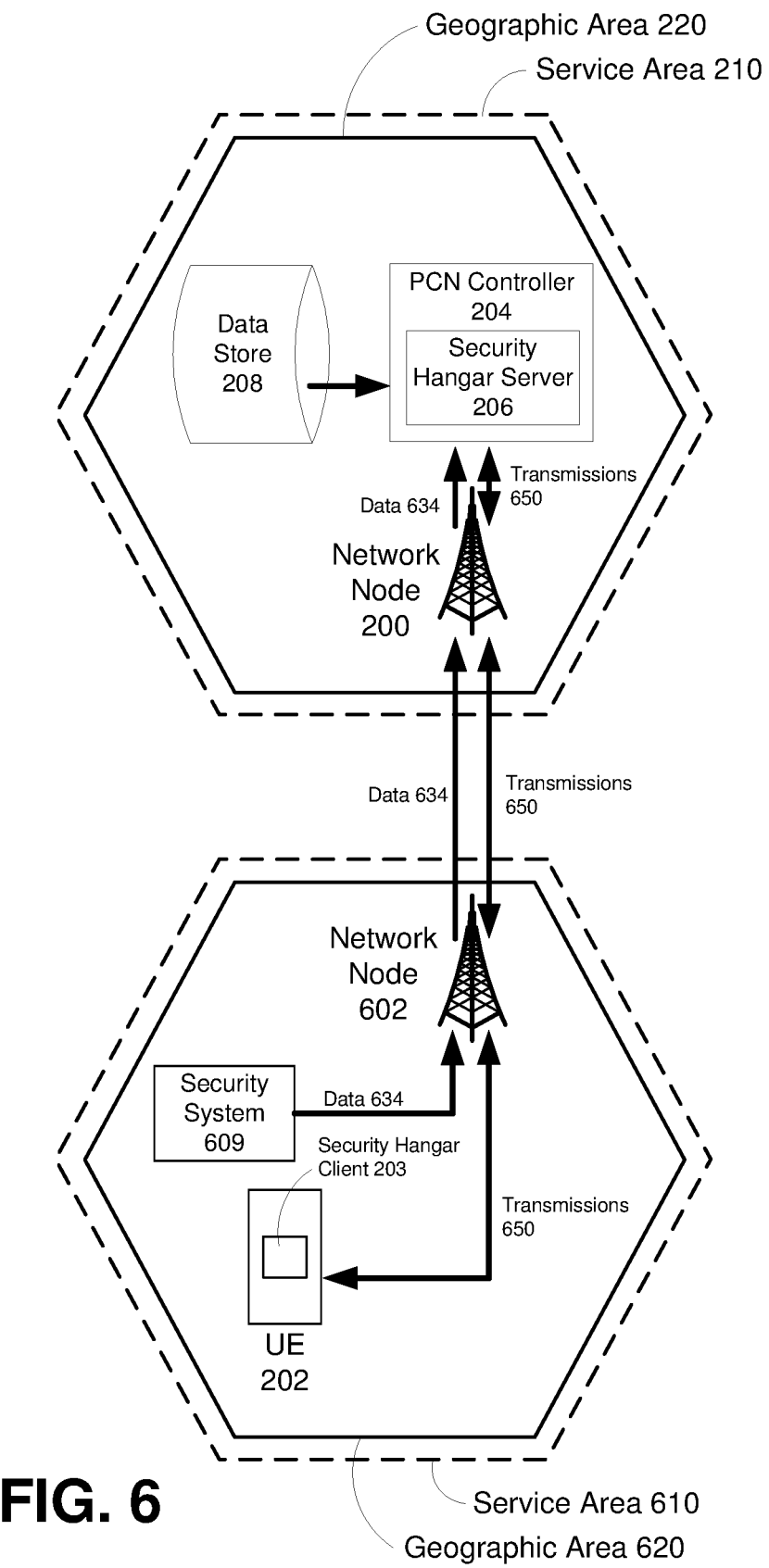
FIG. 6 illustrates an example embodiment in which a PCN is deployed across multiple geographic areas, in accordance with various aspects and embodiments of the subject disclosure.

FIG. 6 illustrates an example embodiment in which a PCN is deployed across multiple geographic areas, in accordance with various aspects and embodiments of the subject disclosure. FIG. 6 includes the PCN introduced in FIG. 2, comprising the network node 200, the PCN controller 204 comprising the SHS 206, and the data store 208. The network node 200 supports a first service area 210 in a first geographic area 220, as described in connection with FIG. 2.

In FIG. 6, a second network node 602 supports a second service area 610 which extends the PCN into a second geographic area 620. The PCN therefore extends to multiple different geographic areas 220, 620. The geographic areas 220, 620 can be contiguous or non-contiguous. Some enterprises can have multiple different campuses in different cities or countries, and the different campuses can be optionally supported by a same PCN as illustrated in FIG. 6. The second network node 602 can cooperate with network node 200 to relay transmissions 650 between UE 202 and PCN controller 204. The transmissions 650 can include, e.g., any of the transmissions illustrated in FIG. 2 and FIG. 3, such as encrypted data 232, code 233, etc. The second network node 602 can also cooperate with network node 200 to relay data 634 from a security system 609 in the geographic area 620 to the PCN controller 204. In an embodiment such as illustrated in FIG. 6, operations described herein in connection with departure 231 and return 331 of the UE 202 from geographic area 220 can be applied in connection with departure and return of the UE 202 from geographic area 620.

Figure 7:
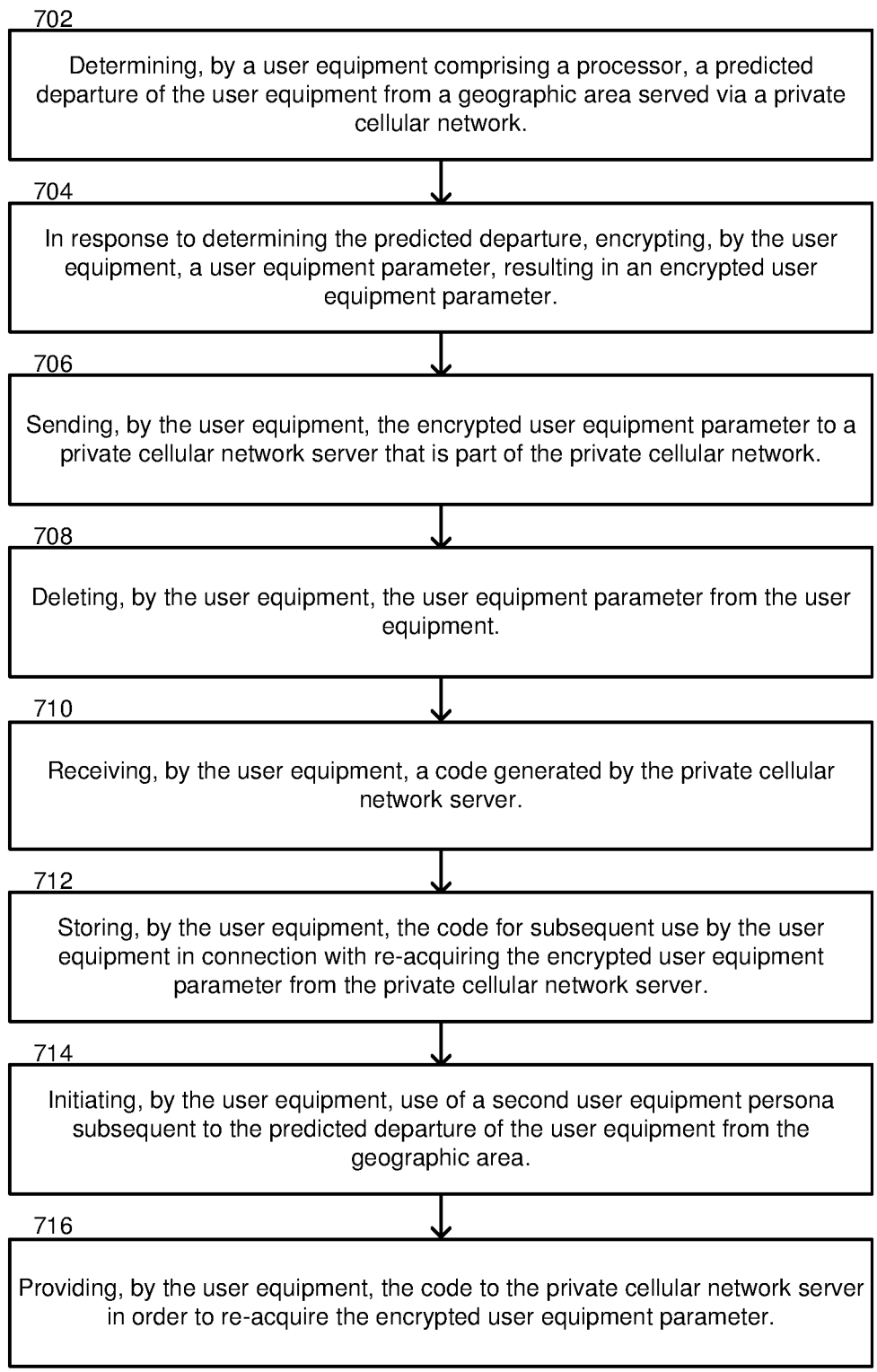
FIG. 7 is a flow diagram representing example operations of user equipment in connection with departing from a PCN, in accordance with various aspects and embodiments of the subject disclosure.

FIG. 7 is a flow diagram representing example operations of user equipment in connection with departing from a PCN, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by UE 202, as illustrated in FIG. 2. Example operation 702 comprises determining, by a user equipment 202 comprising a processor, a predicted departure 231 of the user equipment 202 from a geographic area 220 served via a private cellular network. Determining the predicted departure 231 can be based on any of the various example information disclosed herein. For example, determining the predicted departure 231 can be based on a signal strength associated with the private cellular network, e.g., signal strength of signals received from network node 200.

Example operation 704 comprises, in response to determining the predicted departure 231, encrypting, by the user equipment 202, a user equipment parameter, resulting in an encrypted user equipment parameter. Encrypting the user equipment parameter can comprise, inter alia, generating, by the user equipment 202, an encryption key, wherein the encryption key is used to encrypt the user equipment parameter. The user equipment parameter can comprise any of the various data and parameters described herein. For example, the user equipment parameter can comprise network configuration data for the private cellular network.

Example operation 706 comprises sending, by the user equipment 202, the encrypted user equipment parameter, e.g., as encrypted data 232, to a private cellular network server, e.g., security hangar server 206, that is part of the private cellular network. Example operation 708 comprises deleting, by the user equipment 202, the user equipment parameter from the user equipment 202. Example operation 710 comprises receiving, by the user equipment 232, a code 233 generated by the private cellular network server 206.

Example operation 712 comprises storing, by the user equipment 202, the code 233 for subsequent use by the user equipment 202 in connection with re-acquiring the encrypted user equipment parameter 232 from the private cellular network server 206. Storing the code 233 can be performed by an anti-cloning process executable by the user equipment 202, such as the security hangar client 203.

Example operation 714 comprises initiating, by the user equipment 202, use of a second user equipment persona subsequent to the predicted departure 231 of the user equipment 202 from the geographic area 220. For example, the user equipment parameter can be associated with a first user equipment persona, e.g., the first persona 410 illustrated in FIG. 4, and the user equipment 202 can initiate use of the second user equipment persona 420 subsequent to the eventual departure of UE 202 from the geographic area 220 pursuant to the predicted departure 231.

Example operation 716 comprises providing, by the user equipment 202, the code 233 to the private cellular network server 206 in order to re-acquire the encrypted user equipment parameter 232. Example operation 716 contemplates a return of the user equipment 202 to the geographic area 220.

Figure 8:
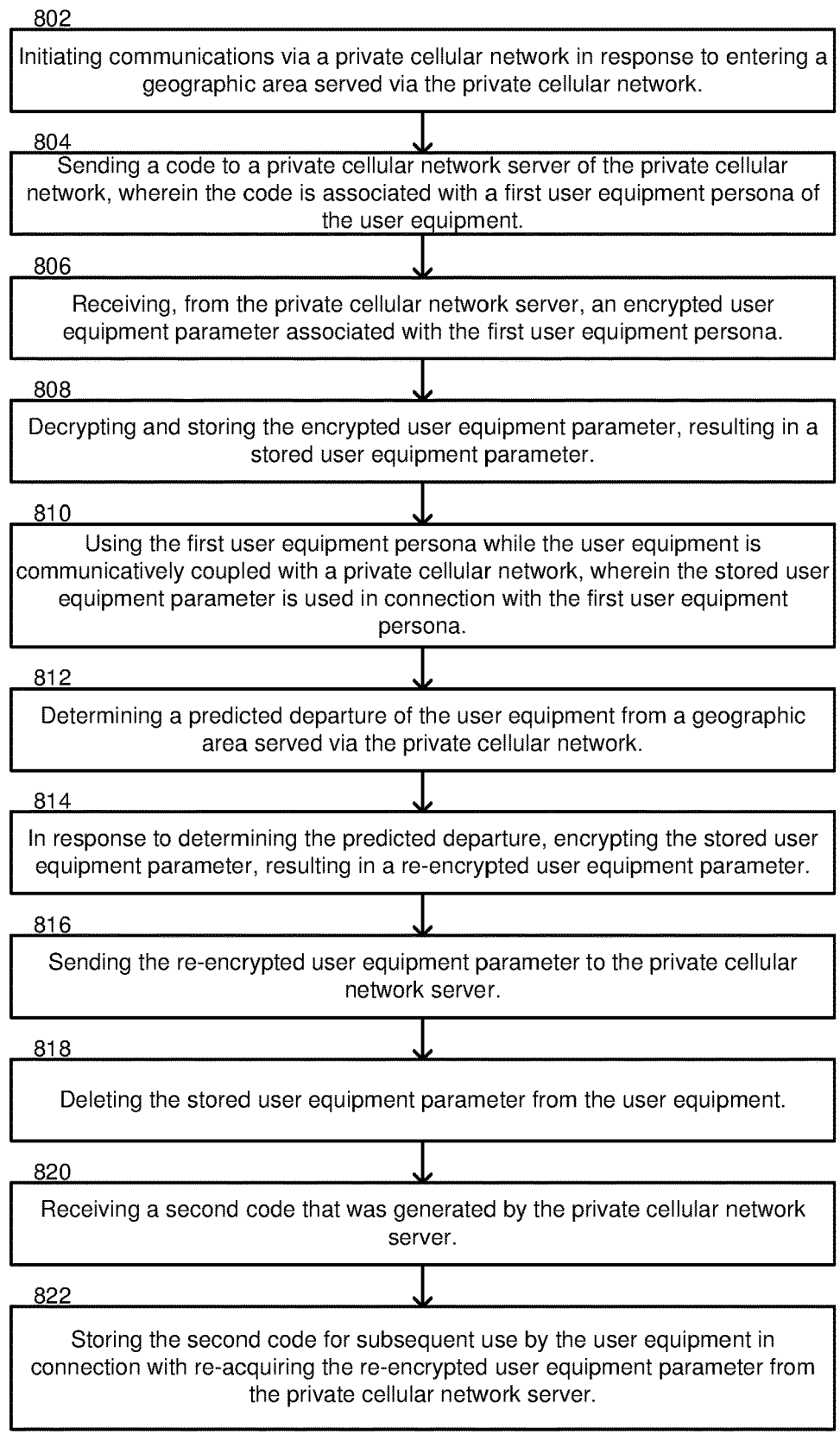
FIG. 8 is a flow diagram representing example operations of user equipment in connection with returning to a PCN, in accordance with various aspects and embodiments of the subject disclosure.

Further operations that can be performed in connection with return of the user equipment 202 are illustrated in FIG. 8.

FIG. 8 is a flow diagram representing example operations of user equipment in connection with returning to a PCN, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by the UE 202 as illustrated in FIG. 3. Example operation 802 comprises initiating communications via a private cellular network, e.g., the PCN enabled by network node 200, in response to entering a geographic area 220 served via the private cellular network.

Example operation 804 comprises sending a code 233 to a private cellular network server 206 of the private cellular network, wherein the code 233 is associated with a first user equipment persona 410 of the user equipment 202. Sending the code 233 to the private cellular network server 206 can be performed by an anti-cloning process, such as security hangar client 203, at the user equipment 202.

Example operation 806 comprises receiving, from the private cellular network server 206, an encrypted user equipment parameter, e.g., encrypted data 232, associated with the first user equipment persona 410.

Example operation 808 comprises decrypting and storing the encrypted user equipment parameter 232, resulting in a stored user equipment parameter. Decrypting and storing the encrypted user equipment parameter 232 can comprise using an encryption key generated by the user equipment 202 previous to the initiating of the communications via the private cellular network at block 802, for example, the encryption key generated pursuant to block 704. The user equipment parameter can comprise any of the various data and parameters described herein. For example, the user equipment parameter can comprise network configuration data for the private cellular network, or for example previous communication data associated with a previous user equipment 202 communication, wherein the previous user equipment 202 communication occurred previous to the initiating of the communications via the private cellular network at block 802.

Example operation 810 comprises using the first user equipment persona 410 while the user equipment 202 is communicatively coupled with the private cellular network, wherein the stored user equipment parameter is used in connection with the first user equipment persona 410.

Example operations 812-822 relate to a subsequent departure of the UE 202 from the geographic area, subsequent to the operations 802-810. Example operations 812-822 are generally similar to operations described with reference to FIG. 7. Example operation 812 comprises determining a predicted departure 231 of the user equipment 202 from the geographic area 220 served via the private cellular network. Example operation 814 comprises, in response to determining the predicted departure 231, encrypting the stored user equipment parameter, resulting in a re-encrypted user equipment parameter. The re-encrypted user equipment parameter can be included in, e.g., encrypted data 232. The encrypting can include generating an encryption key for use in encrypting the stored user equipment parameter. Example operation 816 comprises sending the re-encrypted user equipment parameter 232 to the private cellular network server 206.

Example operation 818 comprises deleting the stored user equipment parameter from the user equipment 202. Example operation 820 comprises receiving a second code that was generated by the private cellular network server 206. The second code can be a newly generated code that differs from the first code 233. Example operation 822 storing the second code for subsequent use by the user equipment 202 in connection with re-acquiring the re-encrypted user equipment parameter 232 from the private cellular network server 206.

Figure 9:
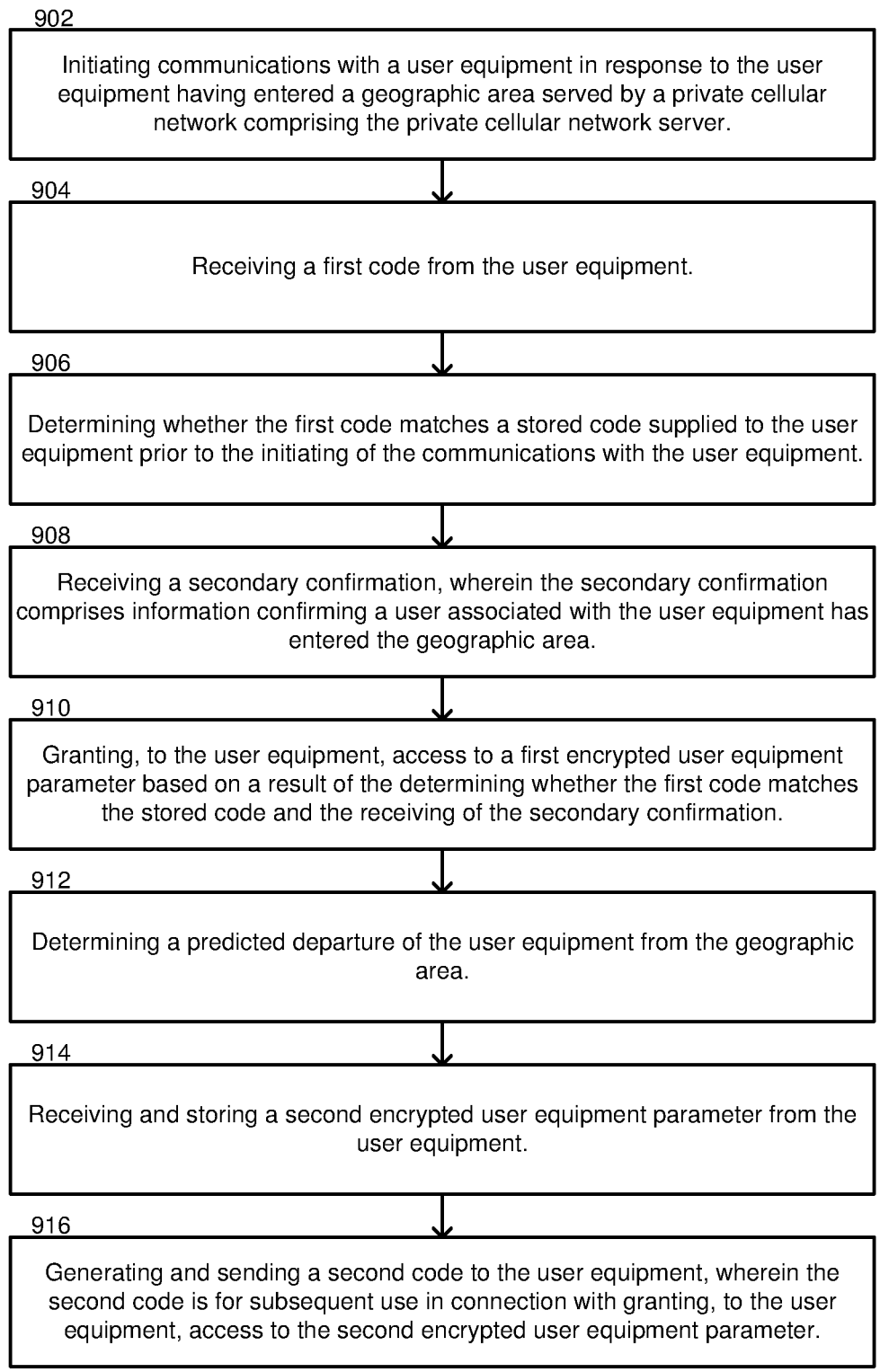
FIG. 9 is a flow diagram representing example operations of PCN equipment in connection with a UE departure from a PCN and subsequent return to the PCN, in accordance with various aspects and embodiments of the subject disclosure.

FIG. 9 is a flow diagram representing example operations of PCN equipment in connection with a UE departure from a PCN and subsequent return to the PCN, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by PCN controller 204 equipped with a security hangar server 206 such as illustrated in FIG. 2 and FIG. 3. Example operation 902 comprises initiating communications with a user equipment 202 in response to the user equipment 202 having entered a geographic area 220 served by a private cellular network comprising the private cellular network server 200. For example, communications can be initiated in response to return 331 illustrated in FIG. 3. In some embodiments, the user equipment 202 may enter or return to any one of multiple different geographic areas served by the private cellular network, for example, the user equipment 202 can enter or return to a geographic area 620.

Example operation 904 comprises receiving a first code 233 from the user equipment 202, as illustrated in FIG. 3. Example operation 906 comprises determining whether the first code 233 matches a stored code supplied to the user equipment 202 prior to the initiating of the communications with the user equipment 202, for example, the first code 233 can be previously supplied to user equipment 202 as described in connection with FIG. 2.

Example operation 908 comprises receiving a secondary confirmation, e.g., return data 334, wherein the secondary confirmation 334 comprises information confirming a user associated with the user equipment 202 has entered the geographic area 220. The secondary confirmation can comprise any of the various return data 334 described herein. For example, the secondary confirmation can comprise a confirmation that the user has been granted access to pass a secure gate that controls access to at least part of the geographic area 220.

Example operation 910 comprises granting, to the user equipment 202, access to a first encrypted user equipment parameter, e.g., encrypted data 232, based on a result of the determining whether the first code 233 matches the stored code and the receiving of the secondary confirmation 334. The first encrypted user equipment parameter 232 can be associated with a first user equipment persona, e.g., the first persona 410 illustrated in FIG. 4, and the first user equipment persona 410 can be authorized for use in connection with the private cellular network.

Example operations 912-914 relate to a subsequent departure of the user equipment 202 from the geographic area 220. Example operation 912 comprises determining a predicted departure 231 of the user equipment 202 from the geographic area 220. Determining the predicted departure 231 of the user equipment 202 from the geographic area 220 can be based on any of the various information described herein. For example, determining the predicted departure 231 can be based on a recognized historical movement pattern associated with the user equipment 202, such as an employee leaving the user equipment 202 every weekday around 5 PM, or other historical movement pattern.

Example operation 914 comprises receiving and storing a second encrypted user equipment parameter from the user equipment. The second encrypted user equipment parameter can be included in encrypted data 232.

Example operation 916 comprises generating and sending a second code to the user equipment 202, wherein the second code is for subsequent use in connection with granting, to the user equipment 202, access to the second encrypted user equipment parameter 232. For example, a second code similar to code 233 can be generated and provided to user equipment 202, and the user equipment 202 can subsequently use the second code to reacquire the encrypted user equipment parameter 232 upon subsequent return 331 to the geographic area 220

Figure 10:
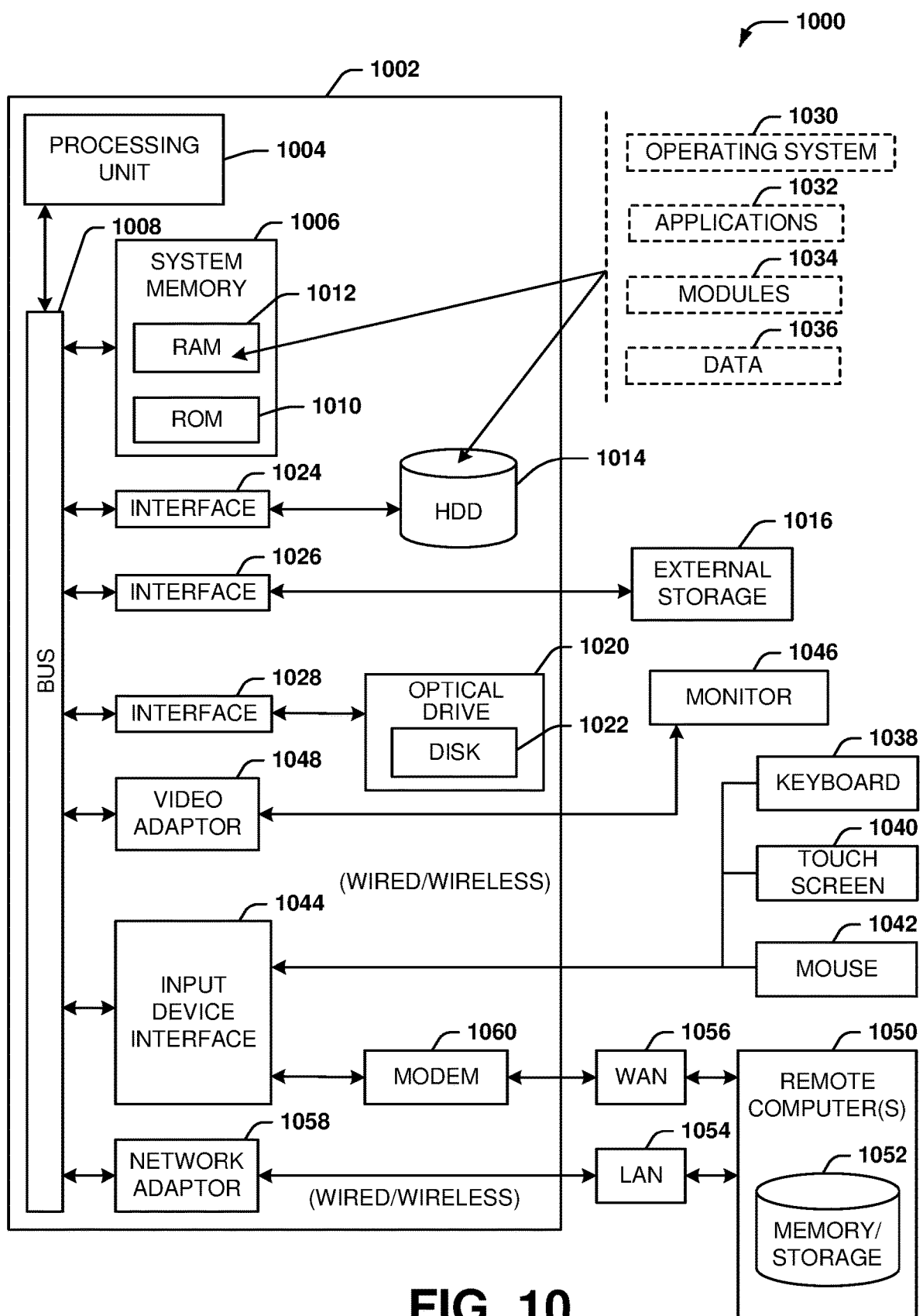
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a user equipment comprising a processor, a predicted departure of the user equipment from a geographic area served via a private cellular network;
   generating, by the user equipment, an encryption key that is local to the user equipment, in response to the determining the predicted departure;
   encrypting, by the user equipment, a user equipment parameter using the encryption key that is local to the user equipment, resulting in an encrypted user equipment parameter;
   sending, by the user equipment, the encrypted user equipment parameter to a private cellular network server that is part of the private cellular network, wherein the encrypted user equipment parameter is sent to the private cellular network without the encryption key;
   deleting, by the user equipment, the user equipment parameter from the user equipment;
   receiving, by the user equipment, a code generated by the private cellular network server;
   storing, by the user equipment, the code for subsequent use by the user equipment in connection with re-acquiring the encrypted user equipment parameter from the private cellular network server; and
   providing, by the user equipment, the code to the private cellular network server in order to re-acquire the encrypted user equipment parameter.

2. The method of claim 1, wherein the user equipment parameter is associated with a first user equipment persona, and further comprising initiating, by the user equipment, use of a second user equipment persona subsequent to the predicted departure of the user equipment from the geographic area.

3. The method of claim 1, wherein the determining the predicted departure is based on a signal strength associated with the private cellular network.

4. The method of claim 1, wherein the user equipment parameter comprises network configuration data for the private cellular network.

5. The method of claim 1, wherein the storing the code is performed by an anti-cloning process executable by the user equipment.

6. A user equipment, comprising:
a processor; and
a memory that stores executable instructions that, when executed by the processor, facilitate performance of operations, the operations comprising:
   initiating communications via a private cellular network in response to entering a geographic area served via the private cellular network;
   sending a code to a private cellular network server of the private cellular network, wherein the code is associated with a first user equipment persona of the user equipment;
   receiving, from the private cellular network server, an encrypted user equipment parameter associated with the first user equipment persona, wherein the encrypted user equipment parameter was previously encrypted by the processor using an encryption key generated local to the user equipment by the processor, and wherein the encrypted user equipment parameter was sent to the private cellular network without the encryption key;
   decrypting and storing the encrypted user equipment parameter, resulting in a stored user equipment parameter, wherein the decrypting the encrypted user equipment parameter comprises using the encryption key generated local to the user equipment; and
   using the first user equipment persona while the user equipment is communicatively coupled with the private cellular network, wherein the stored user equipment parameter is used in connection with the first user equipment persona.

7. The user equipment of claim 6, wherein the stored user equipment parameter comprises previous communication data associated with a previous user equipment communication, and wherein the previous user equipment communication occurred previous to the initiating of the communications via the private cellular network.

8. The user equipment of claim 6, wherein the sending the code to the private cellular network server is performed by an anti-cloning process at the user equipment.

9. The user equipment of claim 8, wherein the stored user equipment parameter is stored by the anti-cloning process at the user equipment.

10. The user equipment of claim 6, wherein the operations further comprise:
   determining a predicted departure of the user equipment from the geographic area served via the private cellular network;
   in response to the determining the predicted departure, re-encrypting the stored user equipment parameter, resulting in a re-encrypted user equipment parameter;
   sending the re-encrypted user equipment parameter to the private cellular network server; and
   deleting the stored user equipment parameter from the user equipment.

11. The user equipment of claim 10, wherein the code is a first code, and wherein the operations further comprise:
   receiving a second code that was generated by the private cellular network server; and
   storing the second code for subsequent use by the user equipment in connection with re-acquiring the re-encrypted user equipment parameter from the private cellular network server.

12. The user equipment of claim 10, wherein the operations further comprise:
   generating a second encryption key, wherein the second encryption key is used to re-encrypt the stored user equipment parameter.

13. The user equipment of claim 10, wherein the predicted departure is determined based on a signal strength associated with the private cellular network.

14. The user equipment of claim 6, wherein the stored user equipment parameter comprises network configuration data for the private cellular network.

15. A non-transitory machine-readable medium, comprising executable instructions that, when executed by a processor at a private cellular network server, facilitate performance of operations, the operations comprising:
   initiating communications with a user equipment in response to the user equipment having entered a geographic area served by a private cellular network comprising the private cellular network server;
   receiving a first code from the user equipment;
   determining whether the first code matches a stored code supplied to the user equipment prior to the initiating of the communications with the user equipment;
   receiving a secondary confirmation, wherein the secondary confirmation comprises information confirming a user associated with the user equipment has entered the geographic area; and
   granting, to the user equipment, access to a first encrypted user equipment parameter based on a result of the determining whether the first code matches the stored code and the receiving of the secondary confirmation, wherein the first encrypted user equipment parameter was encrypted using an encryption key generated local to the user equipment by the user equipment, and wherein the first encrypted user equipment parameter was provided to the private cellular network server without the encryption key.

16. The non-transitory machine-readable medium of claim 15, wherein the operations further comprise:
   determining a predicted departure of the user equipment from the geographic area;
   receiving and storing a second encrypted user equipment parameter from the user equipment; and
   generating and sending a second code to the user equipment, wherein the second code is for subsequent use in connection with granting, to the user equipment, access to the second encrypted user equipment parameter.

17. The non-transitory machine-readable medium of claim 16, wherein the determining the predicted departure of the user equipment from the geographic area is based on a recognized historical movement pattern associated with the user equipment.

18. The non-transitory machine-readable medium of claim 15, wherein the first encrypted user equipment parameter is associated with a first user equipment persona, and wherein the first user equipment persona is authorized for use in connection with the private cellular network.

19. The non-transitory machine-readable medium of claim 15, wherein the secondary confirmation comprises a confirmation that the user has been granted access to pass a secure gate that controls access to at least part of the geographic area.

20. The non-transitory machine-readable medium of claim 15, wherein the geographic area served by the private cellular network comprises one of multiple different geographic areas served by the private cellular network.

* * * * *